(12) United States Patent
Blau et al.

(10) Patent No.: US 8,985,670 B2
(45) Date of Patent: Mar. 24, 2015

(54) SOFT TOP

(71) Applicants: Mirko Blau, Wuppertal (DE); Maximilian Klein, Giessen (DE)

(72) Inventors: Mirko Blau, Wuppertal (DE); Maximilian Klein, Giessen (DE)

(*) Notice: Subject to any disclaimer, the term of this patent is extended or adjusted under 35 U.S.C. 154(b) by 0 days.

(21) Appl. No.: 14/172,154

(22) Filed: Feb. 4, 2014

(65) Prior Publication Data

US 2014/0217769 A1 Aug. 7, 2014

Related U.S. Application Data

(60) Provisional application No. 61/761,784, filed on Feb. 7, 2013.

(51) Int. Cl.
*B60J 7/00* (2006.01)
*B60J 7/12* (2006.01)
*B60J 10/10* (2006.01)
*B60J 1/18* (2006.01)

(52) U.S. Cl.
CPC *B60J 7/123* (2013.01); *B60J 10/10* (2013.01); *B60J 1/1815* (2013.01)
USPC .................................. 296/107.07; 296/146.14

(58) Field of Classification Search
USPC .......................................... 296/107.07, 146.14
See application file for complete search history.

(56) References Cited

U.S. PATENT DOCUMENTS

| | | | | |
|---|---|---|---|---|
| 5,271,655 A | * | 12/1993 | Ball et al. | 296/146.14 |
| 5,454,615 A | * | 10/1995 | Schnepf | 296/95.1 |
| 5,460,424 A | * | 10/1995 | Wagner | 296/146.14 |
| 6,464,285 B1 | * | 10/2002 | Schutt | 296/107.07 |
| 6,471,283 B2 | * | 10/2002 | Windpassinger et al. | 296/146.14 |
| 2002/0047290 A1 | * | 4/2002 | Windpassinger et al. | 296/146.14 |
| 2009/0289468 A1 | * | 11/2009 | Pecho et al. | 296/107.06 |
| 2013/0057017 A1 | * | 3/2013 | Brown et al. | 296/107.07 |

FOREIGN PATENT DOCUMENTS

DE 20207069 U1 8/2002

* cited by examiner

*Primary Examiner* — Lori L Lyjak
(74) *Attorney, Agent, or Firm* — Roberts & Roberts, LLP

(57) ABSTRACT

A soft top for motor vehicles having an apparatus for the replaceable introduction of a pane, and to a soft top of this type having a pane. The soft top has an apparatus for the replaceable introduction of a pane, comprising a flexible roof element and having a pane receiving gap. The roof element is folded over toward the pane receiving gap in an end region which faces the pane receiving gap. An insert element is provided in a pocket which is formed by the folded-over roof element, and a holding element is provided which extends on a first side of the pane receiving gap between a side of the insert element, which side faces away from the pane receptacle, and the roof element and on a second side of the pane receiving gap, which second side lies opposite the first side.

20 Claims, 1 Drawing Sheet

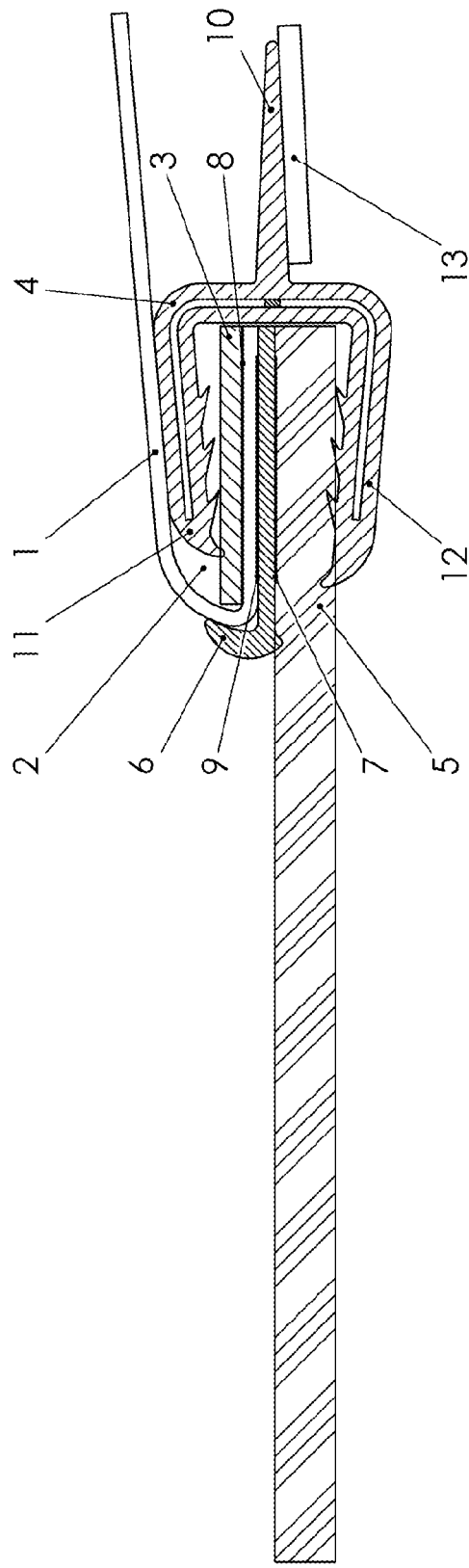

SOFT TOP

CROSS REFERENCE TO RELATED APPLICATION

This application claims the benefit of U.S. Provisional patent application Ser. No. 61/761,784 filed on Feb. 7, 2013, which is incorporated herein by reference.

BACKGROUND OF THE INVENTION

1. Field of the Invention

The present application relates to a soft top for motor vehicles having an apparatus for the replaceable introduction of a pane, and to a soft top of this type having a pane.

2. Description of the Related Art

A soft top of this type is known, for example, from DE 202 07 069 U1. However, known soft tops have the disadvantage that the panes are not replaceable. If a pane is defective or damaged, the entire soft top has to be exchanged or the pane has to be replaced in a complicated process. This is because the pane is usually connected fixedly to the soft top and a release of the pane is at least difficult, if not even impossible, or causes damage to the remaining soft top. The object is achieved by way of a soft top according to the invention. The invention is also achieved by way of a method which is described below.

According to the invention, a soft top having an apparatus for the replaceable introduction of a pane comprises a flexible roof element having a pane receiving gap. Here, the roof element is folded over toward the pane receiving gap in an end region which faces the pane receiving gap. As a result, a pocket of the roof element is formed, in which pocket an insert element is provided. Moreover, a holding element is provided which extends on a first side of the pane receiving gap between a side of the insert element, which side faces away from the pane receptacle, and the roof element and on a second side of the pane receiving gap, which second side lies opposite the first side.

According to the invention, the roof element is therefore folded over and an insert element is provided in said pocket. The holding element also engages into said pocket. Moreover, the holding element extends to the opposite side of the pane receiving gap. Here, it can also delimit the pane receiving gap or can form the pane receiving gap on said second side. The holding element can therefore span the pane receiving gap; in particular, it can be arranged on three sides of the pane receiving gap or can form from one to two sides of the pane receiving gap. The pane receiving gap is as a rule open from one side and is closed from three sides. A pane can be inserted into said pane receiving gap. As a result of a precautionary measure of this type, the pane can be replaced simply, without sealing problems needing to be feared. A sufficient sealing action is ensured by folding over the roof element and providing the insert element and the engagement of the holding element into the pocket and the extent of the holding element onto the second side of the pane receiving gap. However, this does not impede the sealing action being improved by the provision of further sealing elements or a long-life pleasing visual appearance being ensured by the provision of further sealing elements of this type or other elements. The holding element is advantageously configured in such a way that it can exert a clamping action between the first and the second side of the pane receiving gap on an inserted pane. A holding element of this type therefore brings about a force on the surfaces of an inserted pane. The suitability of the holding element results firstly from the material selection and secondly advantageously also from the fact that the dimensioning of the holding element is adapted to the pane which is to be inserted or has been inserted. In particular, an adaptation to standardized panes is to be preferred. The pane is held reliably and the sealing action is improved by way of the clamping action. Here, the clamping action should be configured in such a way that it is possible to replace the pane without damage despite said clamping action.

The holding element is particularly advantageously configured in one piece. This increases the sealing action and simplifies an application of the corresponding clamping action. The holding element is particularly advantageously configured from a flexible material, in particular a thermoplastic, such as PVC, or an elastomer. Said element can also be reinforced with an inner core, such as a metal insert. The pane receiving gap is particularly advantageously of circumferentially closed configuration. This means that the pane receiving gap can, for example, receive a pane completely, with the result that its circumferential edge comes to lie in the pane receiving gap and the pane receiving gap is not interrupted over said circumference. The holding element is also particularly advantageously of correspondingly circumferentially closed configuration and correspondingly single-piece configuration. The insert element is also advantageously of correspondingly circumferential configuration and is of single-piece configuration here. It is also advantageous if the flexible roof element has a corresponding cutout with a circumferential edge and is configured in one piece in the region of the edge. The apparatus for the replaceable introduction of a pane can thus be connected to the flexible roof element with a particularly satisfactory sealing action. The flexible roof element therefore advantageously has a corresponding cutout which, after folding over of the flexible roof element and attachment of the apparatus for the replaceable introduction of a pane, allows the pane to be inserted into said cutout into the apparatus.

If further elements, in particular sealing elements, are used, these are advantageously likewise of circumferentially closed and single-piece configuration. The pane receiving gap is further advantageously configured in its peripheral circumference and/or its width in relation to the pane which is to be inserted or has been inserted, in such a way that said pane receiving gap has an undersize, in particular from 0.5% to 2%. As a result, the sealing action and the strength of the receptacle of the pane can be increased further. The holding element particularly advantageously has a connecting apparatus for connection to a headliner. This is a special advantage which cannot be realized in the prior art at any rate. In known soft tops, the attachment of a headliner is not possible or is possible only with great difficulty. According to the invention, the holding element can therefore have a connecting apparatus which makes it possible to connect a headliner to the holding element in a simple way and therefore to provide it in the soft top in an optically pleasing manner. Here, the headliner is advantageously formed from a flexible material, in particular textile material. The connecting apparatus is particularly advantageously configured for being sewn to the headliner. The soft top can particularly advantageously also comprise a headliner which is sewn to said connecting apparatus. The connecting apparatus is particularly advantageously formed by a lip-shaped projection of the holding element. Said lip-shaped projection extends advantageously here in the direction of the extent of the pane to be inserted. By way of a projection of this type, for example if the holding element is formed from an elastic material, a headliner and/or other connecting elements or another connecting element or other connecting bars or another connecting bar, such as press studs or a zip fastener, can be connected simply to said projection, in particular can be sewn, and can therefore be fastened in a simple and pleasing manner in the soft top and can be included therein. The insert element is particularly advantageously formed from metal, in particular from spring steel. The insert element is advantageously of circumferential configuration and the shape of the circumference of said insert element is advantageously configured so as to correspond to the shape of the circumference of the pane which is to be inserted or has been inserted. This means that the outer edge of the insert element can terminate flush with the pane when the insert element is positioned on or above the pane.

The insert element is particularly advantageously of flat configuration. This means that its height is considerably lower than its extent in other directions. The insert element is advantageously configured as a circumferential belt or in such a way that, when it is brought into congruence with the outer edges of the pane, it covers an outer edge, in particular from 2 mm to 2 cm of the pane. The seal is particularly advantageously provided on a side of the pocket, which side faces the pane receiving gap. A seal of this type can be used, for example, to increase the sealing action or else to improve a long-life pleasing visual appearance. The seal can advantageously form the boundary of the pane receiving gap in one or two directions. Here, the seal particularly advantageously extends at least into the region of the bend of the roof element. As a result, a depression which results at the bend and between said bend and the inserted pane or a recess which results can be closed by the seal. As a result, an accumulation of dirt in said region is largely prevented and a pleasing visual appearance is ensured even for a relatively long time under the influence of the weather. The seal can therefore be configured, for example, as a flat element which extends in the region of the pocket and increases its thickness in the region of the bend. Seals can be composed, for example, of elastomer, thermoplastic elastomer or a mixture, for example elastomer which is embedded and cross-linked in thermoplastic. The pane receiving gap particularly advantageously has adhesive on one side or on both sides. Adhesives of this type can be numerous. For example, double-sided adhesive tape may be suitable here. As a result, the pane receiving gap or the element or elements which delimits/delimit it can be connected fixedly to a pane to be inserted.

An adhesive, in particular a double-sided adhesive means, in particular double-sided adhesive tape, is advantageously provided between that part of the pocket which faces the pane receptacle and the insert element for connecting the insert element and the roof element. Furthermore, if further elements are used, adhesive means are advantageously likewise inserted on both sides of said elements, with the result that they are connected fixedly to the other elements of the receiving apparatus. If, in particular, a seal is used between the folded-over roof element and the pane receiving gap, an adhesive means, for example double-sided adhesive tape, is advantageously provided between said seal and the folded-over roof element. The soft top particularly advantageously comprises at least one supporting element, in particular in the form of a flexible belt, for holding the pane and/or the apparatus for the replaceable introduction. Drooping of the pane can be reduced or prevented by supporting elements of this type. Here, said supporting elements can act both on the flexible roof element, the holding element and the insert element or further elements which are used. A provision of supporting elements is advantageous, in particular, when a headliner is included which can conceal said supporting elements visually. The object is also achieved by a soft top according to one of the preceding claims comprising an at least partially transparent pane. Here, the pane is inserted into the pane receiving gap. In particular, the holding element is configured in such a way that it exerts a clamping action on the pane. Here, the clamping action can be exerted both on the pane surface and on the circumferential pane edge. This can be brought about by the provision of an undersize or the configuration of the holding element in relation to the pane. In particular, a headliner is also included which is sewn, in particular, to the holding element. Moreover, the object is achieved by a method for connecting a flexible roof element to a pane, said connection being of replaceable configuration. According to the invention, first of all the flexible roof element is folded over for this purpose, as a result of which a pocket is produced.

According to the invention, a flexible roof element having a cutout or an edge is provided and the insert element is placed onto it, in particular is fixed on it, in particular with an adhesive means which lies between them. Subsequently or in parallel or beforehand, in an advantageous but not necessary way, a sealing or fitting profile is applied, in particular is fixed there, around the pane or the edges which are to be received in a pane receiving gap. Subsequently, in parallel or beforehand, the flexible roof element is turned over and a pocket is produced as a result, in which the insert element comes to lie. Subsequently, the pane, in particular with an applied sealing or fitting profile, is positioned and advantageously fixed, for example by way of adhesive, for example double-sided adhesive tape or clips. Subsequently, the holding element is folded, in particular folded over and opened. According to the invention, a replacement of the pane is possible by way of removal of the holding element and subsequent separation of the pane from the flexible roof element. A new pane can then be introduced again using the described method steps, the flexible roof element advantageously not being separated from the insert element during the change, with the result that these assembly steps or else the folding over of the flexible roof element can be omitted during the insertion of a new pane. An advantageously used sealing or fitting profile is advantageously likewise replaced during the exchange of the pane. The adhesive means at the transitions of the elements to be replaced are also advantageously replaced. Further advantages and exemplary embodiments are to be explained in a purely exemplary and non-restrictive manner using the following drawing.

SUMMARY OF THE INVENTION

The invention provides a soft top having an apparatus for the replaceable introduction of a pane, comprising a flexible roof element and having a pane receiving gap, the roof element being folded over toward the pane receiving gap in an end region which faces the pane receiving gap, and an insert element being provided in a pocket which is formed by the folded-over roof element, wherein a holding element is provided which extends on a first side of the pane receiving gap between a side of the insert element, which side faces away from the pane receptacle, and the roof element and on a second side of the pane receiving gap, which second side lies opposite the first side.

BRIEF DESCRIPTION OF THE DRAWING

FIG. 1 shows a cross section through a soft top having an apparatus for the replaceable receiving of a pane with an inserted pane.

DESCRIPTION OF THE INVENTION

FIG. 1 shows a cross section through a section of a soft top with an inserted pane. A section of a flexible roof element 1 which is folded over can be seen. A pocket cavity 2 is produced between the folded-over portion. In said pocket cavity 2, an insert element 3 is applied to the flexible roof element 1 with the aid of double-sided adhesive tape 8. Outside the pocket or the pocket cavity 2, a seal 6 is likewise fixed on the flexible roof element 1 by way of double-sided adhesive tape 9. Here, the seal 6 protrudes partially beyond the folded-over portion of the flexible roof element 1. To this end, the seal 6 has a corresponding lug. The seal 6 therefore forms the boundary of the pane receiving gap on one side. The glass pane 5 is inserted into a pane receiving gap which is formed in the receiving apparatus. Said glass pane 5 is connected to the edge-side and circumferential seal 6 by way of double-sided adhesive tape 7. Moreover, a holding element 4 with a first arm 11 and a second arm 12 can be seen. The first arm 11 protrudes into the pocket cavity 2 between the flexible element 1 and the insert element 3. The second arm 12 forms the boundary of the pane receiving gap on the other side, whereas the section which lies between the arms 11, 12 likewise delimits the pane receiving gap on a further side. Moreover, the holding element 4 has a connecting apparatus 10 for connection to a headliner 13. It is to be noted in general that the projections of the holding element 4 and the seal 6 which protrude into other elements in the drawing do not actually protrude into said elements. They have been illustrated in this way merely for improved understanding. They are actually compressed or bent correspondingly and ensure a corresponding sealing action or exertion of a clamping action.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A soft top having an apparatus for the replaceable introduction of a pane, comprising a flexible roof element and having a pane receiving gap, the roof element being folded over toward the pane receiving gap in an end region which faces the pane receiving gap, and an insert element being provided in a pocket which is formed by the folded-over roof element, wherein a holding element is provided which extends on a first side of the pane receiving gap between a side of the insert element, which side faces away from the pane receptacle, and the roof element and on a second side of the pane receiving gap, which second side lies opposite the first side.

2. The soft top according to claim 1, wherein the holding element exerts a clamping action between the first and the second side of the pane receiving gap on an inserted pane.

3. The soft top according to claim 1 wherein the holding element is one piece.

4. The soft top according to claim 1 wherein the holding element comprises a flexible and elastic thermoplastic or an elastomer.

5. The soft top according to claim 1 wherein the pane receiving gap has a circumferentially closed configuration.

6. The soft top according to claim 1 wherein the pane receiving gap is undersized in the pane receiving gap's peripheral circumference in relation to the pane to be inserted.

7. The soft top according to claim 1 wherein the holding element has a connecting apparatus for connection to a headliner.

8. The soft top according to claim 7 wherein the connecting apparatus is sewn to the headliner.

9. The soft top according to claim 7 wherein the connecting apparatus is formed by a lip-shaped projection of the holding element.

10. The soft top according to claim 1 wherein the insert element comprises a metal.

11. The soft top according to claim 1 wherein the insert element is of circumferential configuration and the shape of the circumference of said insert element corresponds to the shape of the circumference of a pane to be inserted.

12. The soft top according to claim 1 wherein the insert element is of flat configuration.

13. The soft top according to claim 1 comprising a seal on a side of the pocket, which side faces the pane receiving gap.

14. The soft top according to claim 13 wherein the seal extends at least into a region of the bend of the roof element.

15. The soft top according to claim 1 wherein the pane receiving gap has adhesive on one side or on both sides.

16. The soft top according to claim 1 wherein at least one supporting element is included to hold the pane or the apparatus for the replaceable introduction.

17. The soft top according to claim 1 comprising an at least partially transparent pane in the pane receiving gap.

18. The soft top according to claim 17 wherein the holding element exerts a clamping action on the pane.

19. The soft top according to claim 17 wherein the holding element has an undersize compared with the thickness of the pane plus the thickness of the elements which are arranged between the holding element and pane or the circumference of the pane.

20. The soft top according to claim 1 further comprising a headliner connected to the holding element.

\* \* \* \* \*